(12) United States Patent
Lin et al.

(10) Patent No.: US 10,776,685 B2
(45) Date of Patent: Sep. 15, 2020

(54) IMAGE RETRIEVAL METHOD BASED ON VARIABLE-LENGTH DEEP HASH LEARNING

(71) Applicant: SUN YAT-SEN UNIVERSITY, Guangzhou, Guangdong (CN)

(72) Inventors: Liang Lin, Guangdong (CN); Ruimao Zhang, Guangdong (CN); Qing Wang, Guangdong (CN); Bo Jiang, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 161 days.

(21) Appl. No.: 15/990,586

(22) Filed: May 25, 2018

(65) Prior Publication Data

US 2018/0276528 A1    Sep. 27, 2018

Related U.S. Application Data

(63) Continuation of application No. PCT/CN2016/074646, filed on Feb. 26, 2016.

(30) Foreign Application Priority Data

Dec. 3, 2015 (CN) .......................... 2015 1 0883581

(51) Int. Cl.
*G06N 3/04* (2006.01)
*G06F 16/58* (2019.01)
(Continued)

(52) U.S. Cl.
CPC ............. *G06N 3/04* (2013.01); *G06F 16/583* (2019.01); *G06F 16/5866* (2019.01);
(Continued)

(58) Field of Classification Search
CPC ........ G06N 3/04; G06N 3/0454; G06N 3/084; G06K 9/627; G06K 9/4628; G06K 9/6215;
(Continued)

(56) References Cited

U.S. PATENT DOCUMENTS 9,704,054 B1 * 7/2017 Tappen .................... G06K 9/46
2014/0310314 A1 * 10/2014 Li .......................... G06F 16/583
707/780
(Continued)

FOREIGN PATENT DOCUMENTS

CN    104834748 A    8/2015

OTHER PUBLICATIONS

Zhang, Ruimao, et al. "Bit-scalable deep hashing with regularized similarity learning for image retrieval and person re-identification." IEEE Transactions on Image Processing 24.12 (2015): 4766-4779. (Year: 2015).*
(Continued)

*Primary Examiner* — Amandeep Saini

(57) ABSTRACT

This invention is an image retrieval method based on bit-scalable deep hashing learning. According to the method, the training images is used to generate a batch of image triples, wherein each of the triples contains two images with the same label and one image with a different label. The purpose of model training is to maximize a margin between matched image pairs and unmatched image pairs in the Hamming space. The deep convolutional neural network is utilized to train the model in an end-to-end fasion, where discriminative images features and has functions are simultaneously optimized. Furthermore, each bit of the hashing codes is unequally weighted so that we can manipulate the code length by truncating the insignificant bits. It is also
(Continued)

shown that the generated bit-scalable hashing codes well preserve the discriminative powers with sorter code lengths.

7 Claims, 6 Drawing Sheets

(51) Int. Cl.
  *G06K 9/62* (2006.01)
  *G06K 9/46* (2006.01)
  *G06F 16/583* (2019.01)
  *G06K 9/72* (2006.01)
  *G06N 3/08* (2006.01)

(52) U.S. Cl.
  CPC ........... *G06K 9/4628* (2013.01); *G06K 9/627* (2013.01); *G06K 9/6215* (2013.01); *G06K 9/6257* (2013.01); *G06K 9/726* (2013.01); *G06N 3/0454* (2013.01); *G06N 3/084* (2013.01)

(58) Field of Classification Search
  CPC .... G06K 9/6257; G06K 9/726; G06F 16/583; G06F 16/5866; G06F 16/58
  USPC ........................................................ 382/157
  See application file for complete search history.

(56) References Cited

U.S. PATENT DOCUMENTS

| | | | |
|---|---|---|---|
| 2016/0059127 A1* | 3/2016 | Perrin | A63F 13/40 348/180 |
| 2016/0180151 A1* | 6/2016 | Philbin | G06K 9/00288 382/118 |
| 2019/0050672 A1* | 2/2019 | Shang | G06F 16/901 |

OTHER PUBLICATIONS

Li, Xi, et al. "Learning hash functions using column generation." arXiv preprint arXiv:1303.0339 (2013). (Year: 2013).*

* cited by examiner

IMAGE RETRIEVAL METHOD BASED ON VARIABLE-LENGTH DEEP HASH LEARNING

CROSS REFERENCE TO RELATED APPLICATIONS

The present application is a Continuation Application of PCT Application No. PCT/CN2016/074646 filed on Feb. 26, 2016, which claims the benefit of Chinese Patent Application No. 201510883581.2 filed on Dec. 3, 2015. All the above are hereby incorporated by reference.

TECHNICAL FIELD

The disclosure relates to the fields of image retrieval and deep learning, and more particularly to an image retrieval method based on variable-length deep hash learning.

BACKGROUND

With the rapid development of the Internet, the number of multimedia information based on images and video has also shown explosive growth. How to get the information you want from massive data has become a widely discussed topic in the industry and academia. A hashing technique has received extensive attention and research due to its huge advantages in both storage space and computational efficiency. As research going deepen, hash learning based on an image content focuses on converting an image into a binary code and can still effectively maintain its semantic relevance to other images. In order to solve the above problems, multiple machine learning-based hash learning algorithms have been proposed. Herein, a class of supervised image hash learning algorithms has shown better effects and has greater potential.

In general, there are two main parts of image hashing learning under a supervision framework. Firstly, an image will be expressed as a form of feature vector by a manually-designed feature descriptor. The purpose of this step is to extract the semantic information of the image in the case of noise or other redundant information of the image. Secondly, a hash learning process is expressed as an optimization problem of the distance between images, so as to maintain the semantic consistency of the images in a learned Hamming space. However, most of the learning methods split the above two processes for processing, so that the feature expression of an image cannot be optimized during the learning of a feature. At the same time, the manual design of image features requires a lot of domain knowledge, and it is difficult to effectively adapt to different application tasks. In recent years, a model called a multi-layer auto-encoder has been proposed. The model may directly obtain image features from an original image and further convert it into a binary code. However, due to its complex optimization process, it is very limited in practical applications.

On the other hand, a hashing code generated by most existing hashing learning algorithms has a fixed length. However, in an real-world application scenario, different coding lengths need to be selected according to different tasks. For example, for a device with fewer computing resources, a shorter hashing code has a more significant computational advantage. However, for high precision tasks, the possibility of selecting a longer hashing code is relatively high. In order to solve the above problem, a relatively straightforward solution is to store hash codes of different bit lengths, but this has a greater waste of learning time and storage space. Therefore, several variable-length hashing learning algorithms have been proposed successively. These methods generate a hash code bit by bit according to the importance level, bits with more importance are generated first. Therefore, a user may select a desired hashing code length from beginning to end as needed. However, these methods are usually closely linked with well-designed feature space, and their retrieval accuracy will drop sharply with the decrease of hashing code bits.

SUMMARY

In order to overcome the existing deficiencies, the present invention provides an image retrieval method based on variable-length deep hashing learning, which semantically describes the feature consistency of similar images by maximizing a margin between a matched image pair and an unmatched image pair in a Hamming space. A convolutional neural network (CNN) is utilized to build the end-to-end relation between the raw image data and the binary hashing codes. Finally, each bit of these output hashing codes is weighted according to their significance so that we can manipulate the code lengths by truncating the insignificant bits Therefore, the hashing codes of arbitrary lengths can then be easily obtained for different application scenarios to reduce retrieval.

In order to achieve the above objective, the technical solution of the disclosure is as follows.

An image retrieval method based on variable-length deep hashing learning comprises the following steps:

S1, preprocessing: organize the training images set into a batch of image triples;

S2, generation of an image hashing code during the training phase: the image triples are feed into the deep convolutional neural network, and directly outputting the hashing code corresponding to an image via network transformation;

S3, optimization of deep neural network parameters during the training phase: calculating the loss generated from each image, and training the deep convolutional neural network via the back propagation algorithm;

S4, calculation of image similarity during the test phase: truncating the unimportant hashing bit according to the input of a user, and calculating the weighted Hamming distance between the query image and each image in the database;

S5, return of the query result during the test phase: ranking images in the database in a descending order according to the weighted Hamming distance in S4, the ranking result is the returned similarity retrieval result.

In this invention, a series of triples are organized by the training images and the image triples are used to maximize the margin between matched image pairs and unmatched image pairs in the Hamming space, thereby effectively mining the consistency within the training image intra-class and the difference inter-class, and solving the problem of maintaining the similarity of pictures with the same semantic information in the Hamming space.

Preferred, organizing the training set into a batch of image triples in S1 specifically comprises: randomly selecting some images from the training data set as center images. On the basis of the determined center images, an image with the same label as the center images and an image with a different label are selected to form the image triples.

This invention is characterized by utilizing the deep convolutional neural network into the learning part, and implementing an end-to-end training process by optimizing the image feature learning and hashing function learning jointly. Thus, the hashing code can be directly extracted from the original image through the convolutional neural network. The step of manually designing features in traditional methods is eliminated. The total loss of the deep neural network is to accumulate losses generated from each image during the training process, and then the back propagation algorithm is used to update parameters in the network.

Preferably, the deep convolutional neural network in S2 comprises the following components: several convolution layers and pooling layers, part of fully-connected layers, a sign-like tangent function layer, and a hashing weight layer. The output of the penultimate fully-connected layer represents a feature vector of a picture. Parameters in the last fully-connected layer represent parameters of the hashing function. The sign-like tangent function layer is a sign-like tangent function with a feature vector as its input and each dimension ranging in [−1, 1], where the function has a harmonic parameter used to control its smoothness. As the parameter is smaller, the function is smoother. The hashing weight layer is a deep network layer with the output of the sign-like tangent function layer as its input, each dimension corresponding to a weight.

Preferably, a specific implementation manner for parameter learning of the deep convolutional neural network in S3 is: calculating the loss with an image as the center, calculating the loss of a certain image in all triples, and accumulating them to obtain a total loss. Specifically, a specific existence form (as a center image, as a positive sample, as a negative sample, or not at all in a triple) of a certain image in triples is first determined. Then, the corresponding loss is calculated according to the specific existence form. If the image does not exist in a certain triple, the loss of the image in the triple is set to zero. The losses of the image in different existence forms in all triples are accumulated to obtain a total loss. Each time when the parameters of the deep convolutional neural network are updated, a batch of images is loaded at one time, and several triples are generated randomly by using these images. The loss of this batch of images on this triple set is counted. A back propagation algorithm is used to update the parameters of the deep convolutional neural network.

This invention has the advantage that for different query tasks, a user may select the length of a hash code according to actual needs.

The algorithm then truncates the hashing code according to the weight of each hashing bit, thereby achieving the length variability of the hashing code. This invention effectively solves the goal of one-time training and multi-task availability. In the case of limited computing resources and storage space, the present method can still keep the discriminatory property in the case of a short hashing code.

Preferably, a specific implementation manner for calculating image similarity in S4 is: acquiring the length-determined hashing code, and determining a hashing bit length L to be selected; selecting first L bits with greater weights in a descending order by using the weight of each bit learned by the hashing weight layer in the deep convolutional neural network, so as to truncate hashing bits; and calculating a weighted Hamming distance by using the truncated hash bits as a final similarity measurement for two images.

Preferably, a specific implementation manner for calculating the weighted Hamming distance by using a quick look-up table method in S4 is: constructing a look-up table with a size of $2^L$ according to the selected hashing bit length L, each element in the look-up table corresponding to the result ($2^L$ possibilities) of an XOR operation between two hashing codes with a length of L; in conjunction with the weight of each hashing bit, calculating the value of each weighted XOR operation, and storing it at a corresponding position in the look-up table; during query, calculating the result of the XOR operation according to two input hashing code values, and returning the value stored at the corresponding position in the look-up table as a result, so as to obtain a weighted Hamming distance of the two hashing codes.

Preferably, the weighted Hamming distances are sorted in S5, and the adopted sorting algorithm is any one of quick sorting algorithm, merge sorting algorithm or selective sorting algorithm.

In this invention, learning the extraction of image features with rich information and the learning of approximate hashing functions are two very important research directions in the field of image retrieval. At the same time, current multimedia applications require that a bit-scalable according to different application scenarios. Based on the above requirements, an image retrieval method based on bit-scalable deep hashing learning is proposed, which mainly relates to the fields of image retrieval and deep learning. According to the method, the learning of hashing codes is modeled into a similarity learning process. Specifically, according to the method, a training image is used to generate a batch of image triples, wherein each of the triples contains two images with the same label and one image with a different label. The purpose of model training is to maximize a margin between matched image pairs and unmatched image pairs in the Hamming space. A deep convolutional neural network is introduced into the learning part of the method, and image feature learning and hashing function learning are optimized jointly, so as to implement an end-to-end training process. Furthermore, each bit of a hashing code as the output of the convolutional network has different weights. For different retrieval tasks, the user can adjust and control the length of a hashing code by truncating unimportant bit. At the same time, the method can effectively preserve the discriminatory property under the condition that the hashing code is short.

Compared with the related work, this invention has advantages as follows.

1. This invention is an image retrieval method based on bit-scalable deep hashing learning. By using a deep neural network, the method integrates image feature learning and hashing function learning processes into an end-to-end framework, thereby achieving joint optimization of the two processes. The situation in which an existing method heavily relies on the embedded image feature space in hash function learning is overcome.

2. This invention is an image retrieval method based on bit-scalable deep hashing learning. In a retrieval process, the method emphasizes that different retrieval tasks are handled by selecting weighted bits, thereby overcoming the defects of solving different tasks by storing different bits of hashing codes in most existing methods. At the same time, a look-up table method for a weighted hashing code is proposed to further ensure the retrieval efficiency of bit-scalable hashing.

3. This invention is an image retrieval method based on bit-scalable deep hashing learning. In the process of hash code learning, this method introduces a relative similarity comparison based on image triple comparison, which can effectively mine intra-class consistency and inter-class difference, thereby guaranteeing that the generated hashing code can effectively preserve the similarity in an instance level.

DETAILED DESCRIPTION OF THE EMBODIMENTS

Figure 1:
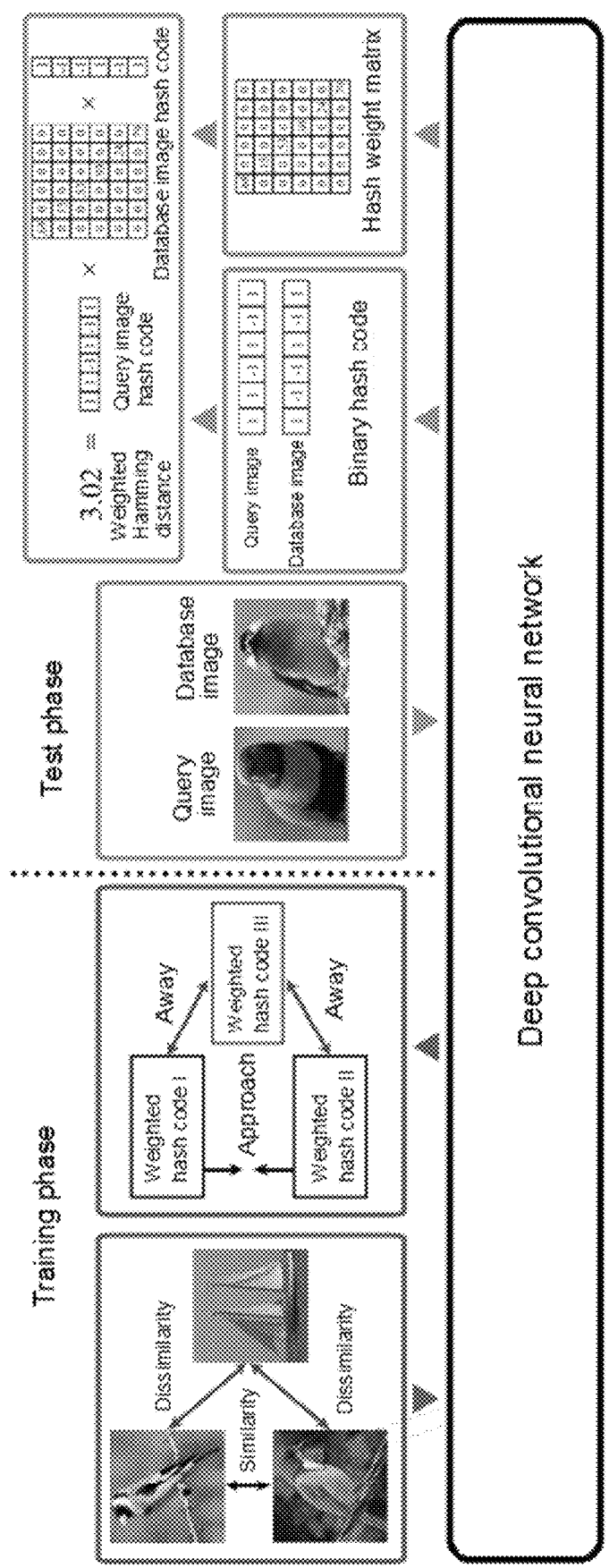
FIG. 1 is a frame diagram of an image retrieval method based on bit-scalable deep hashing learning.

The figures are only for illustrative purposes and should not be interpreted as limiting this invention In order to better describe the present embodiment, some components of the figures will be omitted, enlarged or reduced, and do not represent actual product sizes.

It will be understood by those skilled in the art that some of the well-known structures and their descriptions may be omitted in the drawings. The technical solutions of the disclosure will be further described below with reference to the accompanying drawings and embodiments.

Figure 2:
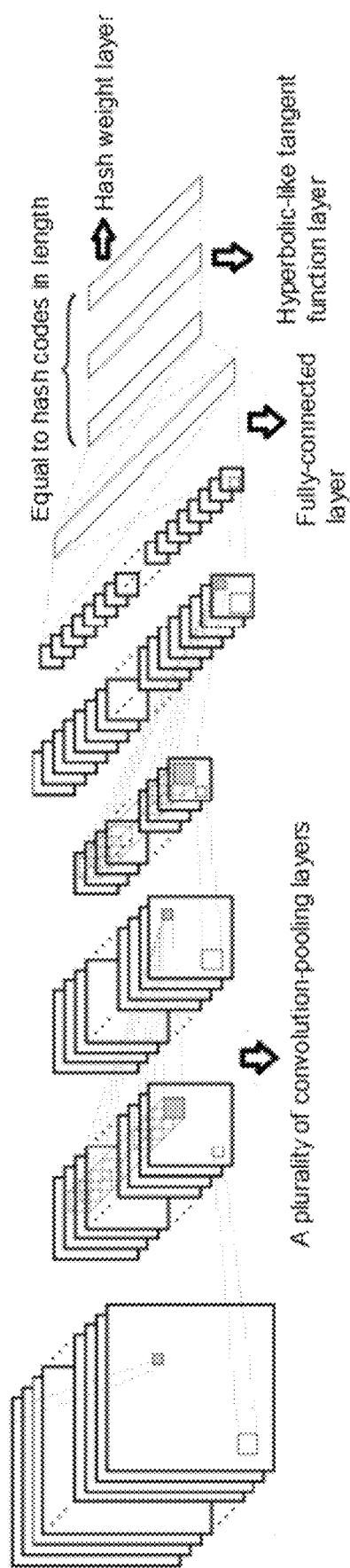
FIG. 2 is a framework diagram of a deep neural network for an image retrieval method based on variable-length deep hash learning according to the invention.
Figure 3:
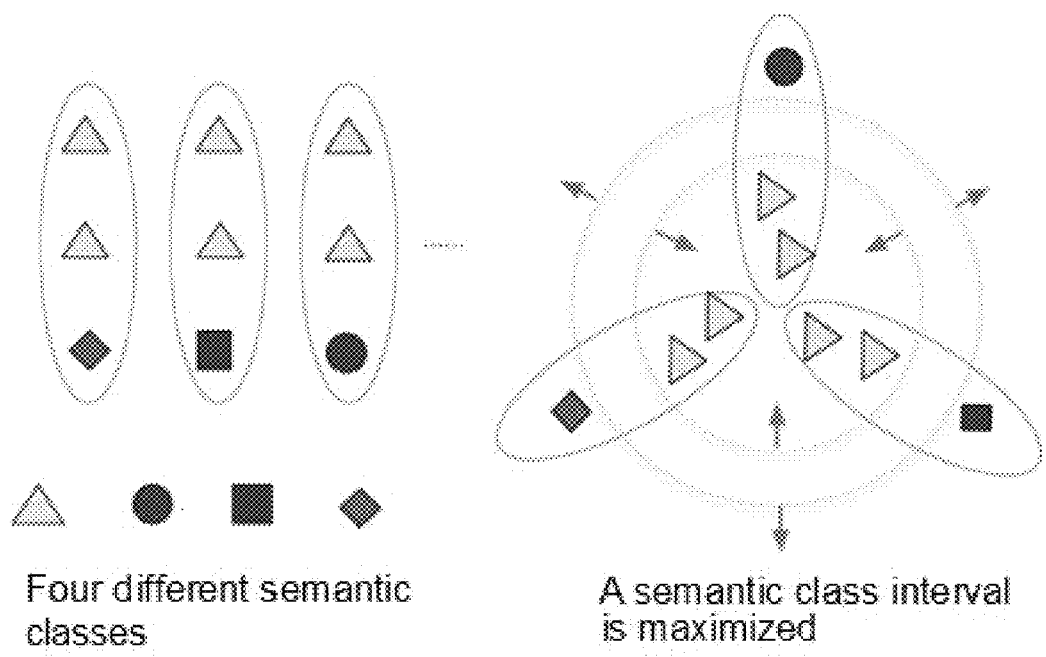
FIG. 3 is a schematic diagram of image similarity hash learning according to the invention.
Figure 4:
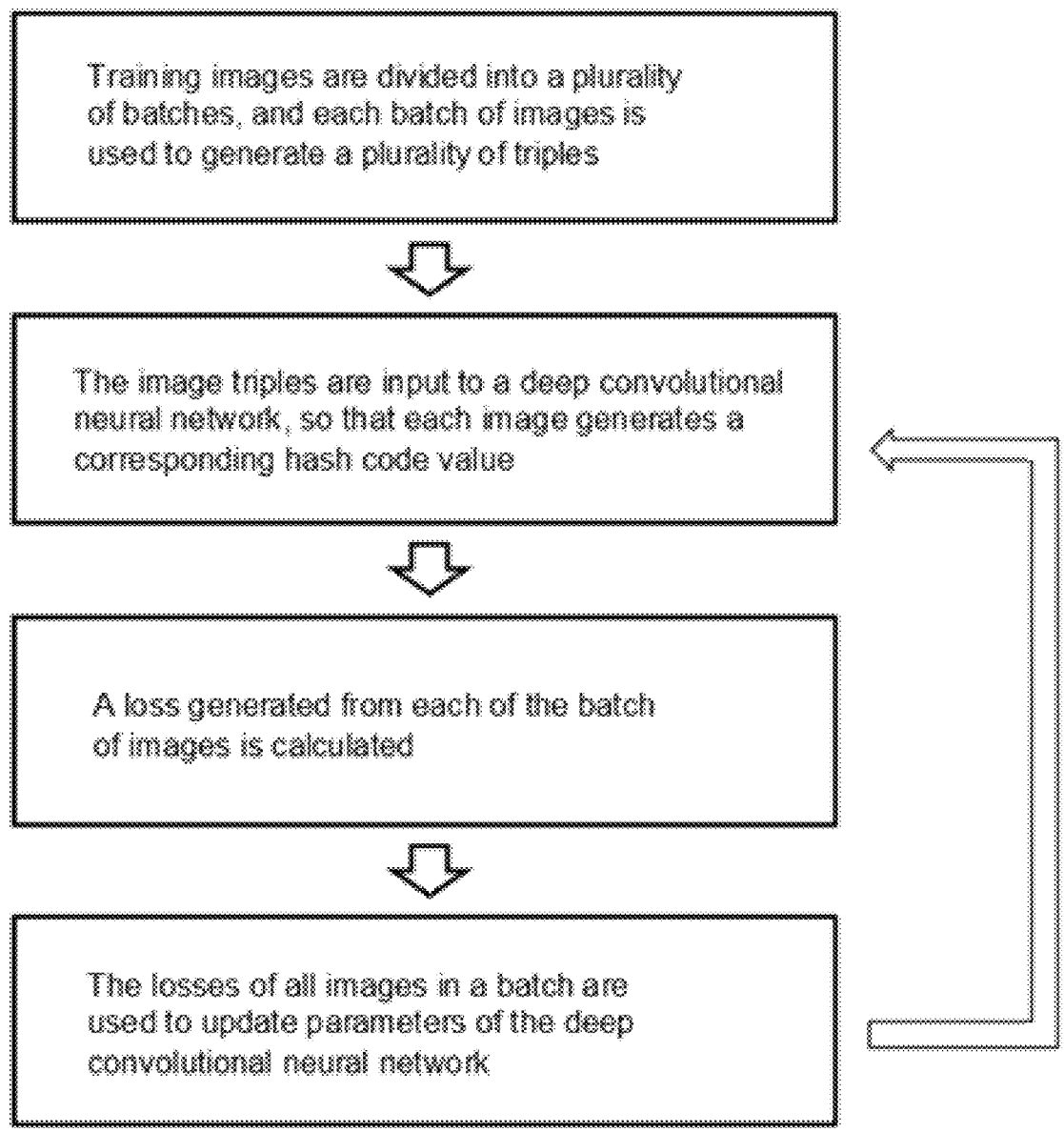
FIG. 4 is a training flowchart of an image retrieval method based on bit-scalable deep hash learning according to the invention.
Figure 5:
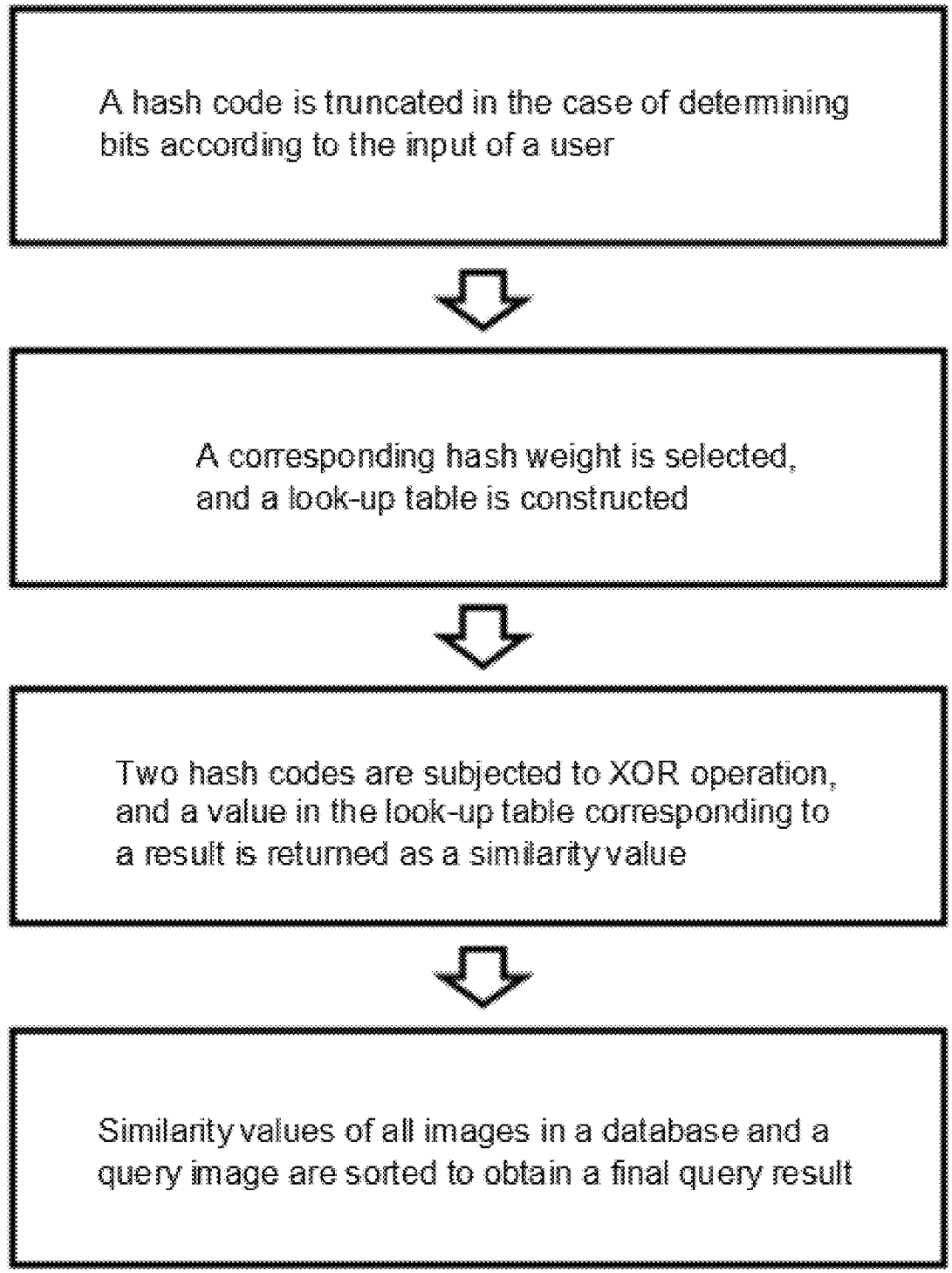
FIG. 5 is a retrieval flowchart of an image retrieval method based on bit-scalable deep hash learning according to the invention.
Figure 6:
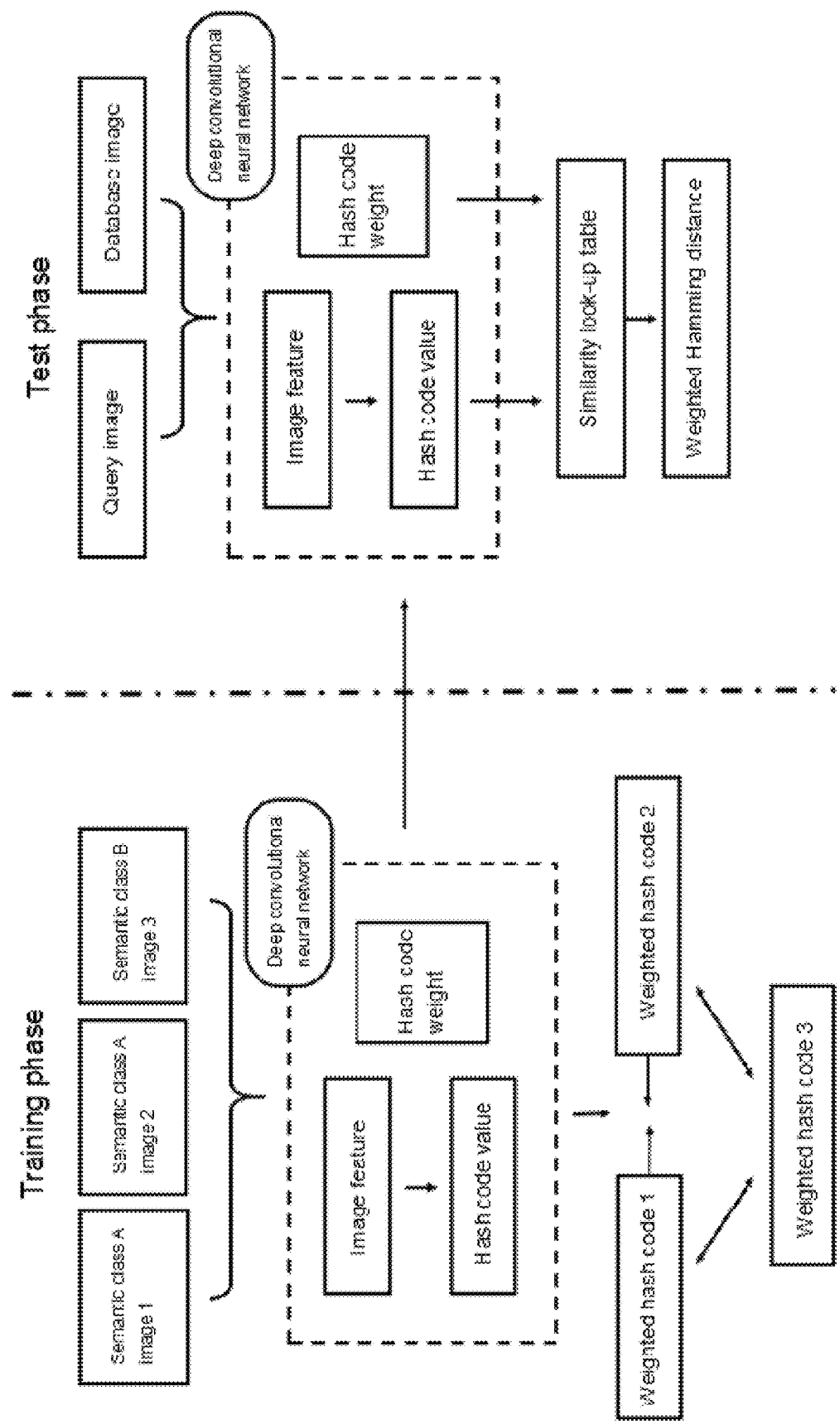
FIG. 6 is a flowchart of an image retrieval method based on bit-scalable deep hash learning according to the invention.

As shown in FIG. 1 to FIG. 6, an image retrieval method based on bit-scalable deep hashing learning comprises the following steps:

Preprocessing: organizing the training images into a batch of image triples;

Generation of an image hashing code during a training phase: feeding the image triples into the deep convolutional neural network, and directly outputting the corresponding hashing code via network transformation;

Optimization of deep neural network parameters during the training phase: calculating the loss generated from each image, and training the deep convolutional neural network via the back propagation algorithm;

Calculation of image similarity during the test phase: truncating the unimportant hashing bit according to the requirement of the user, and calculating a weighted Hamming distance between a query image and each image in the database;

return the query result during the test phase: ranking the images in the database in a descending order according to the weighted Hamming distance in S4, the ranking result is the returned similarity retrieval result.

The above steps are specifically as follows.

Step A: A training image set is organized into a batch of image triples. It is assumed that training images may be divided into K semantic classes, each of which contains P images. Therefore, a total of K*P*(P−1)*(K−1)*P triples may be generated, which is far more than the number of training pictures. In a real-world situation, images in the training data set may usually reach to million in practice, so under certain hardware conditions (the number of images that can be loaded at one time for a video memory is determined), the pictures cannot be loaded at one time. To this end, we implement the model training in a batch-process fashion. The specific implementation is as follows. First, semantic classes are selected, and images are randomly selected from each semantic class. Then, for each selected image, we construct a fixed number of triplets, and in each triplet the image having different label from the selected image is randomly selected from the remaining categories. In this way, after a batch of images are loaded, semantic classes of the generated triples are relatively centralized, so the discriminative information of two semantic classes can be learned more effectively during the training process. However, a triple generation mode is not limited to this.

Step B: The embodiment can finally take an image as an input, and finally output a hashing code corresponding to the image via the deep neural network. However, in the implementation process, an algorithm gradually obtains binarized image hashing codes during optimization of deep neural network parameters. Specifically, in the present embodiment, a sign-like tangent function layer is added to the deep neural network, and this layer takes a feature vector as an input, and each dimension of the output ranges in [−1,1]. A form is:

$$o(v) = \frac{1 - \exp(-\beta v)}{1 + \exp(-\beta v)}$$

where v is the feature expression for the output of the last full convolution layer of the deep neural network, where $\beta\beta$ is a harmonic parameter used to control its smoothness, and when $\beta$ becomes infinite, a sign-like tangent function will infinitely approach a sign function. In the present embodiment, the value of $\beta$ increases from 2 to 1000 as the training progresses, so the value of its output is gradually binarized. During the test phase, the sign function is adopted as the activation function to obtain the discrete hash code.

Step C: Although each loss generated in the present embodiment is based on the triple, network parameters may still be optimized by calculating the gradient by calculating each image loss. In the present embodiment, an image-oriented gradient calculation method is proposed to optimize the parameters of the deep neural network, but an optimization solution for the network parameters is not limited thereto.

The specific implementation is as follows. First, an image $I_j$ of which the loss needs to be calculated specifically, and the gradient of the image is initialized to be pd=0. For any triple $(I_i, I_i^+, I_i^-)$ loaded, if $I_j = I_i$, $pd = pd + 2*(h_i^- w - h_i^+ w)$;

if $I_j = I_i^+$, $pd = pd - 2*(h_i w - h_i^+ w)$; and if $I_j = I_i^-$, $pd = pd + 2*(h_i w - h_i^- w)$, where $h_i, h_i^+, h_i^-$ are hash codes corresponding to images $I_i, I_i^+, I_i^-$, and w is the weight of a hash weight layer in a deep convolutional neural network. A final output of pd is the gradient of an image $I_j$.

Step D: In a test phase, in order to quickly calculate the weighted Hamming distance between hash codes generated by two images, the present embodiment provides a quick look-up table method. However, the solution of the weighted Hamming distance is not limited to this.

The quick look-up table method is specifically as follows. A hash code with a certain length is obtained, and a hash bit length L to be selected is determined according to the input of a user. By using the weight of each bit learned by the hashing weight layer in the deep convolutional neural network, the first L bits with the greater weight are selected in a descending order, so as to truncate hash bits. A look-up table with a size of $2^L$ is constructed according to the selected hash bit length L, each element in the look-up table corresponding to the result ($2^L$ possibilities) of an XOR operation between two hash codes having a length of L. In conjunction with the weight of each hash bit, the value of each weighted XOR operation is calculated, and stored at a corresponding position in the look-up table. During query, the result of the XOR operation is calculated according to two input hash code values, and the value stored at the corresponding position in the look-up table is returned as the result, so as to obtain the weighted Hamming distance of the two hash codes. In the above case, if the selected hash code is too long, the length of the look-up table becomes too large, and it becomes impractical to use the query to exhaust all possible XOR operations. In view of this, the present embodiment proposes a segmented calculation solution. Specifically, the algorithm divides the selected L bits into several segments (for example, 8 bits for each segment). Each hash code corresponds to a sub-table, and each position in the sub-table corresponds to an output value of the XOR operation corresponding to two hash codes. Therefore, the total weighted Hamming distance may be finally obtained by accumulating the return value of each segment.

Step E: The final stage of the test is to rank the weighted Hamming distances between each image in the database and the query image in a descending order, and finally obtain a ranking list. The front in the ranking list is similar to the query image, while the rear is not similar. In the present embodiment, quick sorting algorithm is used to rank the weighted Hamming distances, but the sorting algorithm is not limited to this algorithm.

Obviously, the above embodiments of this invention are merely examples for clearly describing the invention, rather than limiting the embodiments of the invention. For those of ordinary skill in the art, other different variations or changes may be made on the basis of the above description. There is no need and no exhaustion for all of the embodiments. Any modification, equivalent replacement and improvement made within the spirit and principle of the disclosure should fall within the protection scope of the claims of the disclosure.

What is claimed is:

1. An image retrieval method based on bit-scalable deep hashing learning, comprising:
   S1, reorganizing the training images into a batch of image triples;
   S2, feeding the image triples into the deep convolutional neural network;
   S3, calculating the loss from each image, and training the deep convolutional neural network via a back propagation algorithm;
   S4, truncating the unimportant hash bit according to the input of a user, and calculating the weighted Hamming distance between a query image and each image in the database;
   S5, ranking images in the database in a descending order according to the weighted Hamming distance in S4, the ranking result is the returned similarity retrieval result;
   wherein the deep convolutional neural network in S2 comprises several convolution layers and pooling layers, part of fully-connected layers, a sign-like tangent function layer, and a hashing weight layer; The sign-like tangent function layer is a sign-like tangent function with a feature vector as the input and each dimension ranging in [−1, 1], where the function has a harmonic parameter used to control its smoothness, and as the parameter is smaller, the function is smoother; And the hashing weight layer is a deep network layer with the output of the sign-like tangent function layer as its input, each dimension corresponding to a weight.

2. The image retrieval method based on bit-scalable deep hashing learning according to claim 1, wherein the image triple in S1 specifically comprises two images with the same label and one image with a different label.

3. The image retrieval method based on bit-scalable deep hashing learning according to claim 1, wherein a training process of the deep convolutional neural network in S3 is an end-to-end process, thereby achieving joint optimization of an image feature learning and a hashing function learning;
   the image feature is the input of the penultimate fully-connected layer of the deep convolutional network;
   and the parameters of the hashing function are directly corresponding to all parameters contained by the last fully-connected layer.

4. The image retrieval method based on bit-scalable deep hashing learning according to claim 1, wherein a loss of each image in S3 is calculated by maximizing a margin between matched image pairs and unmatched image pairs in the Hamming space, satisfying:

$$W^* = \min_W \sum_i \max\{H(h_i, h_i^+) - H(h_i, h_i^-), C\}$$

where W is a parameter of a deep convolutional neural network, $H(\bullet, \bullet)$ represents a distance between two hash codes in a Hamming space, and C is a constant for reducing influence of noise to the model.

5. The image retrieval method based on bit-scalable deep hashing learning according to claim 1, wherein the unimportant hash bit in S4 is determined by the weight of the hash bit, where the smaller weight represents the less importance of the hash bit.

6. The image retrieval method based on bit-scalable deep hashing learning according to claim 1, wherein calculating the weighted Hamming distance in S4 comprises the following steps:
   S-a, acquiring the weight of an important hash bit;
   S-b, constructing a look-up table having a length of $2^l$, where l is the length of an important hash bit, and a value $2^l$ is equal to all possible XOR results generated by two hash codes;
   S-c, calculating a weighted Hamming affine distance under each XOR result, and storing the result at a corresponding position of the look-up table; and
   S-d, calculating XOR values of the two hash codes, and returning corresponding values thereof in the look-up table.

7. The image retrieval method based on bit-scalable deep hashing learning according to claim 6, wherein in the case of a larger l, the look-up table having a length of $2^l$ may be split into a plurality of sub-tables having equal lengths, each sub-table corresponding to a hash code having a fixed length; each value in the sub-tables represents weighted similarity of a corresponding sub-hash code; and a weighted affine distance between two hash codes may be finally obtained by accumulating weighted affinities of each hash code.

* * * * *